(12) United States Patent
Herbeck et al.

(10) Patent No.: US 9,104,740 B2
(45) Date of Patent: *Aug. 11, 2015

(54) ENHANCED ATTRIBUTE SYNCHRONIZATION IN A CONTENT MANAGEMENT SYSTEM

(71) Applicant: International Business Machines Corporation, Armonk, NY (US)

(72) Inventors: David G. Herbeck, Rochester, MN (US); John E. Petri, Lewiston, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/048,805

(22) Filed: Oct. 8, 2013

(65) Prior Publication Data

US 2014/0108336 A1     Apr. 17, 2014

Related U.S. Application Data

(63) Continuation of application No. 11/464,344, filed on Aug. 14, 2006, now Pat. No. 8,583,595.

(51) Int. Cl.
*G06F 17/30* (2006.01)

(52) U.S. Cl.
CPC .... *G06F 17/30575* (2013.01); *G06F 17/30174* (2013.01); *G06F 17/30289* (2013.01)

(58) Field of Classification Search
CPC ............... G06F 17/30174; G06F 17/30212; G06F 17/30873; G06F 17/30289; G06F 17/30575; G06F 17/30864
USPC .................................................. 707/749, 752
See application file for complete search history.

(56) References Cited

U.S. PATENT DOCUMENTS

| | | | |
|---|---|---|---|
| 7,024,429 B2 * | 4/2006 | Ngo et al. ...................... 707/802 |
| 8,583,595 B2 | 11/2013 | Herbeck et al. |
| 8,769,127 B2 * | 7/2014 | Selimis et al. ................ 709/229 |
| 2002/0101880 A1 | 8/2002 | Kim |
| 2003/0120593 A1 | 6/2003 | Bansal et al. |
| 2007/0260971 A1 | 11/2007 | Rivas et al. |
| 2007/0282951 A1 * | 12/2007 | Selimis et al. ................ 709/205 |
| 2008/0040345 A1 | 2/2008 | Cameron |

* cited by examiner

*Primary Examiner* — Shahid Alam
(74) *Attorney, Agent, or Firm* — Patterson & Sheridan, LLP

(57) ABSTRACT

Embodiments of the invention provide a method, system, and article of manufacture for enhanced attribute synchronization in a content management system (CMS). One-way synchronization rules associated with objects stored in the CMS may be applied to synchronize both the substantive content and/or metadata included in a particular data object (e.g., an XML document) with attributes maintained by the CMS. The one-way synchronization rules may synchronize information stored in the data object with information stored in the CMS attributes. Alternatively, the one-way synchronization rule may synchronize information stored in the CMS attributes with information stored in the data object.

20 Claims, 5 Drawing Sheets

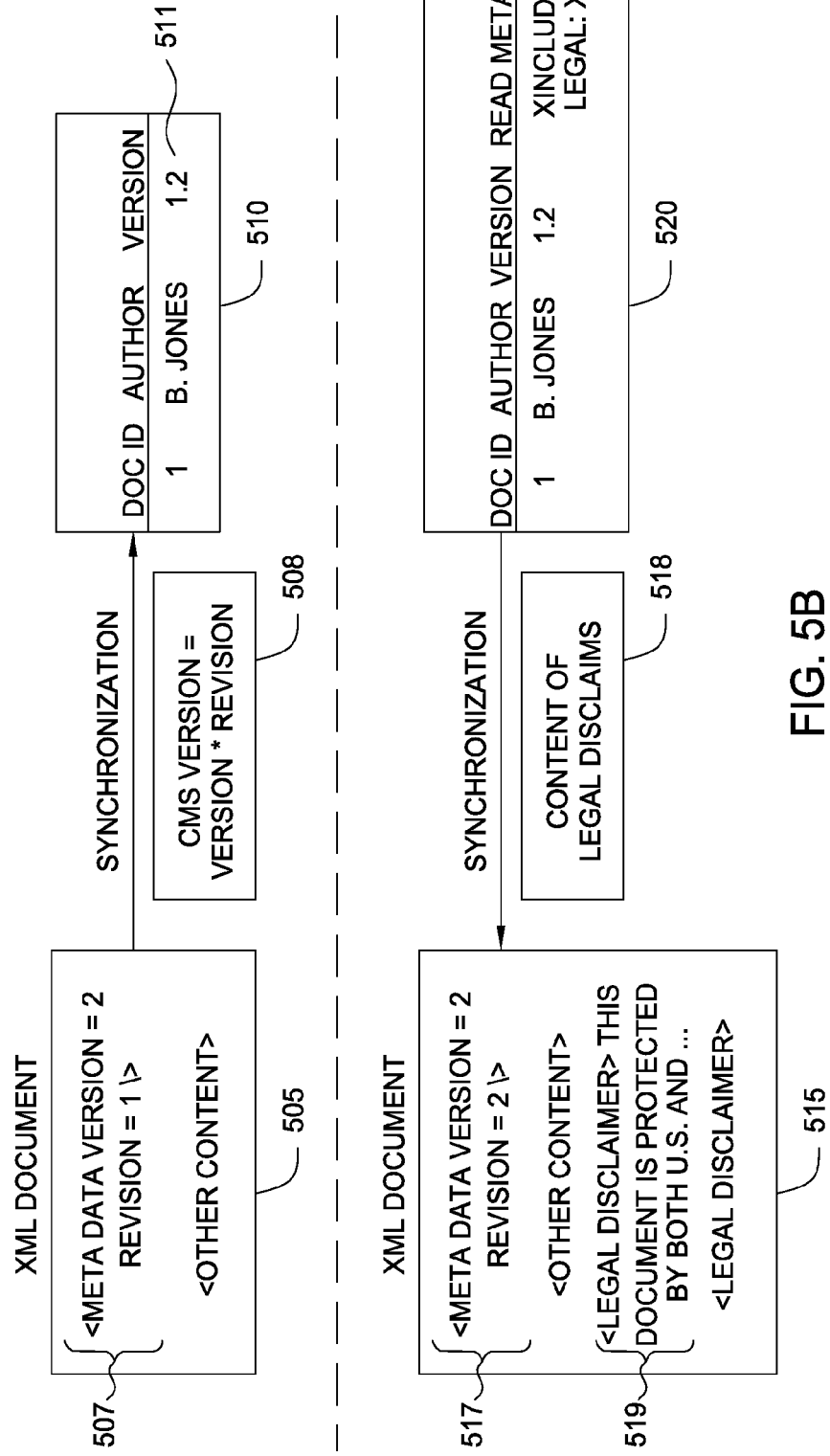

ENHANCED ATTRIBUTE SYNCHRONIZATION IN A CONTENT MANAGEMENT SYSTEM

CROSS-REFERENCE TO RELATED APPLICATIONS

This application is a continuation of co-pending U.S. patent application Ser. No. 11/464,344, filed Aug. 14, 2006. The aforementioned related patent application is herein incorporated by reference in its entirety.

BACKGROUND

1. Field of the Invention

Embodiments of the invention are generally related to information stored in a content management system. More specifically, embodiments of the invention are related to a method and system for enhanced attribute synchronization in a content management system.

2. Description of the Related Art

Content management systems (CMS) allow multiple users to share and create information. Generally, a CMS system allows users to create, modify, archive, search, and remove data objects from an organized repository. The data objects managed by CMS may include documents, spreadsheets, database records, digital images and digital video sequences. A CMS typically includes tools for document publishing, format management, revision control, indexing, search and retrieval.

One useful feature provided by some CMS systems allows users to have content from a data object synchronized with data attributes managed by the CMS. For example, a word processing document may have embedded metadata reflecting a version or author of the document. At the same time, the CMS may record similar information such as version or document numbers. A CMS system may be configured to update the version number maintained by the CMS whenever the version number reflected in the embedded metadata is changed. Thus, synchronization rules may be used to ensure that the content of a data object stored in the CMS and attributes about the data object maintained by the CMS are synchronized with one another.

Synchronization features may be very useful for targeted searches on XML content, as it is typically more straightforward to build metadata queries in a CMS. Accordingly, some CMS systems provide a mechanism for bidirectional synchronization. That is, a single CMS attribute may be synchronized with a single piece of XML content whenever either the CMS attribute or the XML content is updated. However, the bidirectional nature of synchronization in current systems lacks certain features and flexibility needed to meet advanced synchronization demands. For example, current systems cannot process complex synchronization rules or a synchronization scheme where data from multiple CMS attributes is used to synchronize document metadata or contents and vice versa.

Accordingly there remains a need in the art for techniques for enhanced attribute synchronization in a content management system.

SUMMARY

Embodiments of the invention provide a method, system, and article of manufacture for enhanced attribute synchronization in a content management system (CMS). One embodiment of the invention includes a method of performing a one-way synchronization between a data object managed by a CMS and CMS attributes related to the data object maintained by the CMS. The method generally includes selecting the data object to be synchronized, identifying one or more one-way synchronization rules to apply to the selected data object and the CMS attributes, and synchronizing the data object and CMS attributes by applying the one or more one-way synchronization rules to the selected data object and the CMS attributes.

In a particular embodiment, the one-way synchronization rule synchronizes information stored in the data object with information stored in the CMS attributes. For example, the data object may be an XML document, and the one-way synchronization rule may specify an element, an attribute, or element content to update in the XML document, based on the values of one or more CMS attributes. Alternatively, the one-way synchronization rule synchronizes information stored in the CMS attributes with information stored in the data object. For example, the data object may be an XML document, and the one-way synchronization rule may specify multiple CMS attributes to update based on the values of multiple elements or attributes in the XML document.

Another embodiment of the invention includes a computer-readable medium containing a program which, when executed, performs an operation for performing a one-way synchronization between a data object managed by a CMS and CMS attributes related to the data object maintained by the CMS. The operations may generally include selecting the data object to be synchronized, identifying one or more one-way synchronization rules to apply to the selected data object and the CMS attributes, and synchronizing the data object and CMS attributes by applying the one or more one-way synchronization rules to the selected data object and the CMS attributes.

Still another embodiment of the invention includes a system having a processor and a memory containing a content management system (CMS) configured to perform a one-way synchronization between a data object managed by the CMS and CMS attributes related to the data object maintained by the CMS. The CMS may be generally configured to perform the steps of selecting the data object to be synchronized, identifying one or more one-way synchronization rules to apply to the selected data object and the CMS attributes, and synchronizing the data object and CMS attributes by applying the one or more one-way synchronization rules to the selected data object and the CMS attributes.

BRIEF DESCRIPTION OF THE SEVERAL VIEWS OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 5A illustrates a one-way synchronization between the content of a data object and attributes maintained by a content management system, according to one embodiment of the invention.

FIG. 5B illustrates a one-way synchronization between attributes maintained by a content management system and the content of a data object, according to one embodiment of the invention.

DETAILED DESCRIPTION

Figure 1:
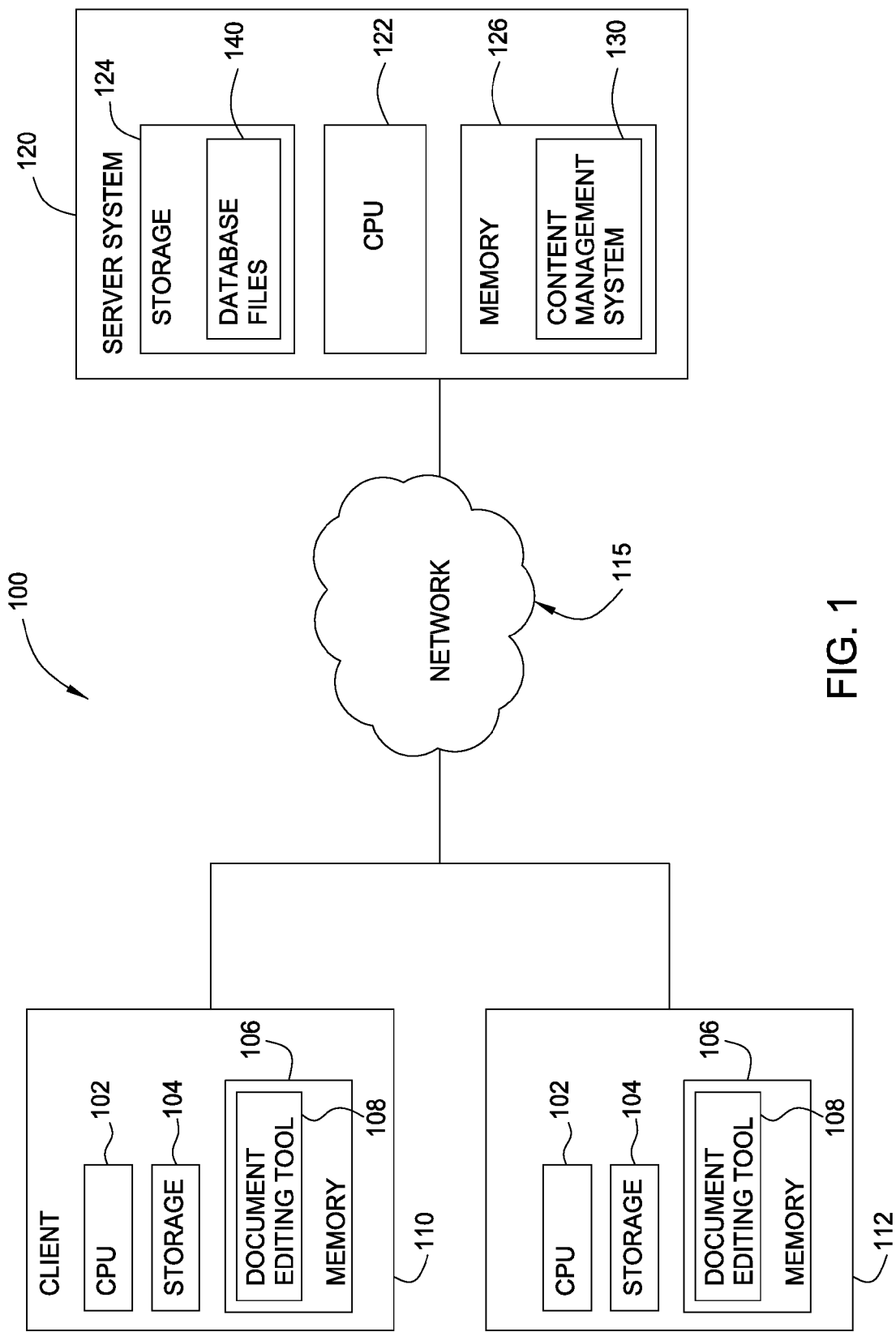
FIG. 1 is a block diagram illustrating a computing environment and content management system, according to one embodiment of the invention.

Embodiments of the invention provide a method, system, and article of manufacture for enhanced attribute synchronization in a content management system (CMS). In one embodiment, one or more synchronization rules associated with objects stored in the CMS may be used to synchronize both the metadata and/or substantive content included in a particular data object (e.g., an XML document) with attributes maintained by the CMS. As used herein "synchronization" generally refers to a process of replicating values from the content or metadata included in a data object to data attributes about that data object maintained by the CMS, and vice-versa. For example, a synchronization rule may specify a one-way synchronization from CMS attributes to the elements, attributes, or content of a data object (e.g., an XML document). Or in the other "direction," a synchronization rule may specify a one-way synchronization from the elements, attributes, or content of a data object, and/or any combination of CMS attributes to attributes about that data object maintained by the CMS.

An attribute to content synchronization rule may be used to enforce a one-way synchronization from CMS attribute to the content of a data object; meaning this rule should only be used when the CMS attributes associated with a given data object are updated. For example, using XML an attribute to content rule may map many attribute values and/or variable XML content and/or static text to one piece of XML content. An attribute to content synchronization rule could be used where multiple users are working on a document (e.g. a document owner and content author). The document owner may desire that certain CMS attributes should always get propagated to the content of the document (e.g., the text of a legal disclaimer in a product manual), but that changes that the author makes to the content do not get propagated back to the CMS attribute.

A content to attribute synchronization rule may be used to enforce a one-way synchronization from document content to CMS attributes; meaning rules of this rule should only be used when the contents of a given data object managed by the CMS are updated. For example, using XML, a content to attribute synchronization rule may be used to synchronize variable XML content and/or many CMS attribute values and/or static text with a single CMS attribute. Thus, one CMS attribute may be the composite of multiple values from various sources.

Embodiments of the invention are described herein relative to the widely used XML markup language. As is known, an XML document may be used to describe virtually any type of data. For example, XML grammars have been used to describe word processing documents, spreadsheets, database records, digital images and digital video, to name but a few. Further, specialized grammars are frequently used to describe domain-specific data objects, such as rules regarding the structure, content, attributes, or semantics of a particular document type. However, the invention is not limited to the XML markup language and the use of XML documents; rather, embodiments of the invention may be adapted to other markup languages or other data object formats or data representations, whether now known or later developed.

Further, the following description references embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable media. Illustrative computer-readable media include, but are not limited to: (i) non-writable storage media (e.g., read-only memory devices within a computer such as CD-ROM or DVD-ROM disks readable by a CD- or DVD-ROM drive) on which information is permanently stored; (ii) writable storage media (e.g., floppy disks within a diskette drive or hard-disk drive) on which alterable information is stored. Other media include communications media through which information is conveyed to a computer, such as through a computer or telephone network, including wireless communications networks. The latter embodiment specifically includes transmitting information to/from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram that illustrates a client/server view of computing environment 100, according to one embodiment of the invention. As shown, computing environment 100 includes two client computer systems 110 and 112, network 115 and server system 120. The computer systems 110, 112, and 120 illustrated in environment 100 are included to be representative of existing computer systems, e.g., desktop computers, server computers laptop computers, tablet computers and the like. However, embodiments of the invention are not limited to any particular computing system, application or network architecture and may be adapted to take advantage of new computing systems as they become available. Additionally, those skilled in the art will recognize that the computer systems illustrated in FIG. 1 are simplified to highlight aspects of the present invention and that computing systems and networks typically include a variety of additional elements not shown in FIG. 1.

As shown, client computer systems 110 and 112 each include a CPU 102, storage 104, and memory 106, typically connected by a bus (not shown). CPU 102 is a programmable logic device that performs all the instructions, logic and mathematical processing performed in executing user applications (e.g., a query tool 108). Storage 104 stores application programs and data for use by client computer systems 110 and 112. Typical storage devices 104 include hard-disk drives, flash memory devices, optical media and the like. Network 115 generally represents any kind of data communications network. Accordingly, network 115 may represent both local and wide area networks, including the Internet.

Illustratively, memory 106 of client computer systems 110 and 112 includes a client application 108. In one embodiment, the editing tool 108 is software application that allows end users to access information stored in a content management system (e.g., CMS 130). The client application 108 may be configured to allow users to create, edit, and save a data object, e.g., word-processing documents, spreadsheets, database records, digital images or video data objects. However, regardless of the function or data type manipulated by client application 108, users may check-in and -out data objects from CMS 130 running on server system 120. In one embodiment, client application 108 may be configured to process data objects marked up using the XML markup language.

As shown, server system 120 also includes a CPU 122, storage 124 and memory 126. Illustratively, storage 124 includes a database 140, and memory 126 includes CMS 130. As stated, CMS 130 may provide a system for creating, modifying, arching and removing information resources from an organized repository (e.g., database files 140). Typically, CMS 130 may include tools used for publishing, format management, revision control, indexing, and search and retrieval of data objects stored by storage 124 and database 140.

Figure 2:
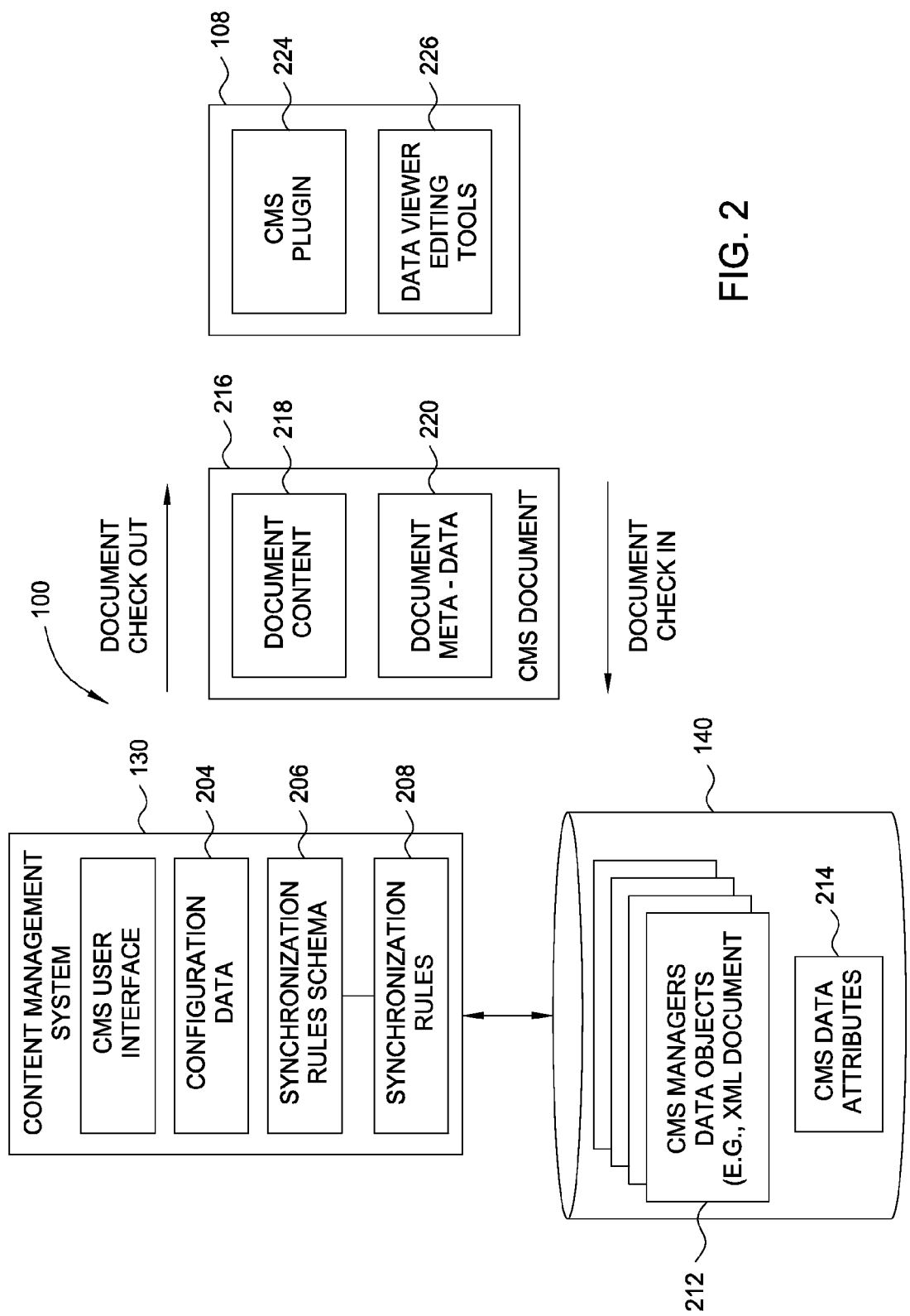
FIG. 2 is a block diagram illustrating components of a client application used to check-in and check-out documents from a content management system, according to one embodiment of the invention.

FIG. 2 is a block diagram further illustrating components of a client application 108 used to check-in and check-out a document 216 from CMS 130 and database 140, according to one embodiment of the invention. Additionally, FIG. 2 illustrates components of CMS 130 that may be used for enhanced attribute synchronization by CMS 130. One skilled in the art will recognize that the CMS 130 illustrated in FIG. 2 is simplified to highlight aspects of the present invention and that content management systems typically include a variety of additional elements not shown in FIG. 2.

As shown, CMS 130 includes a user interface 202, configuration data 204, synchronization rules schema 206, and synchronization rules 208. Generally, user interface 202 provides users with an interface to the functions provided by CMS 130 and data objects 212 stored by database 140. Accordingly, user interface 202 may provide mechanisms for checking in/out a data object (e.g., an XML document) from CMS 130, for specifying configuration data 204, for specifying synchronization rules 208, and/or for synchronizing information included in a data object 212 with CMS data attributes 214 related to that object, and vice-versa.

Synchronization rules 208 may define a framework for composing rules related to a particular data object 212 stored by CMS 130. For example, the synchronization rules 208 applicable to a word-processing document may be different from the rules applicable to a spreadsheet. Further, synchronization rules 208 may be specialized based on the type of document, e.g., a rule may only be applicable to word processing documents representing a product manual, or other substantive document type. In one embodiment, the rules schema 206 may be composed as an XML Schema or DTD. Generally, a DTD provides a statement of rules for an XML document specifying which elements (the markup tags) and attributes (values associated with specific tags) that are allowed in a particular document. In other words, rules schema 206 may provide a grammar used for composing enhanced attribute synchronization rules used by CMS 130.

Thus, CMS 130 may be configured for a particular document type, so that CMS 130 uses the rules whenever a document of that type flows into or out of the repository. As stated, synchronization rules 208 may specify how a particular document (e.g., CMS data object 216) should be synchronized with CMS 130. In one embodiment, data object 216 and CMS data attributes 124 may be synchronized whenever the data object 216 is checked-in or checked-out by a user. Additionally, CMS user interface 202 may allow a user to invoke a synchronization process for a data object 212. Illustratively, CMS data object 216 is shown to include document content 218 and document metadata 220. Document content 218 represents the substantive data contained in a given CMS data object 216. For example, document content 218 may represent the text and presentation settings for a word processing document or the columns, formulas, functions and data stored in a spreadsheet. Document metadata 220 represents data stored with a data object 216, apart from content 218. For example, a word processing document may include document metadata 220 specifying an author, creation date, version and the like.

Illustratively, client application 108 includes CMS plug-in 224 and data viewing and editing tools 226. Editing tools 226 provide the features associated with a particular client application 108. For example, a word processing application may provide tools for specifying text and presentation style or a CAD application may include tools for creating precise three-dimensional digital models of real-world objects. Of course, depending on the function of client application 108, the exact features provided by viewing/editing tools 226 will vary. CMS plug-in 224 allows client application 108 to interact with CMS 130. For example, plug-in 224 may allow a user interacting with client application 108 to check-in and check-out documents from CMS 130 or to synchronize document content 218 and document metadata 220, according to any synchronization rules 208 associated with a given CMS data object 216. In one embodiment, CMS 130 may provide an application programmer interface (API) allowing developers to compose a CMS plug-in 224 for a particular client application 108.

Figure 3:
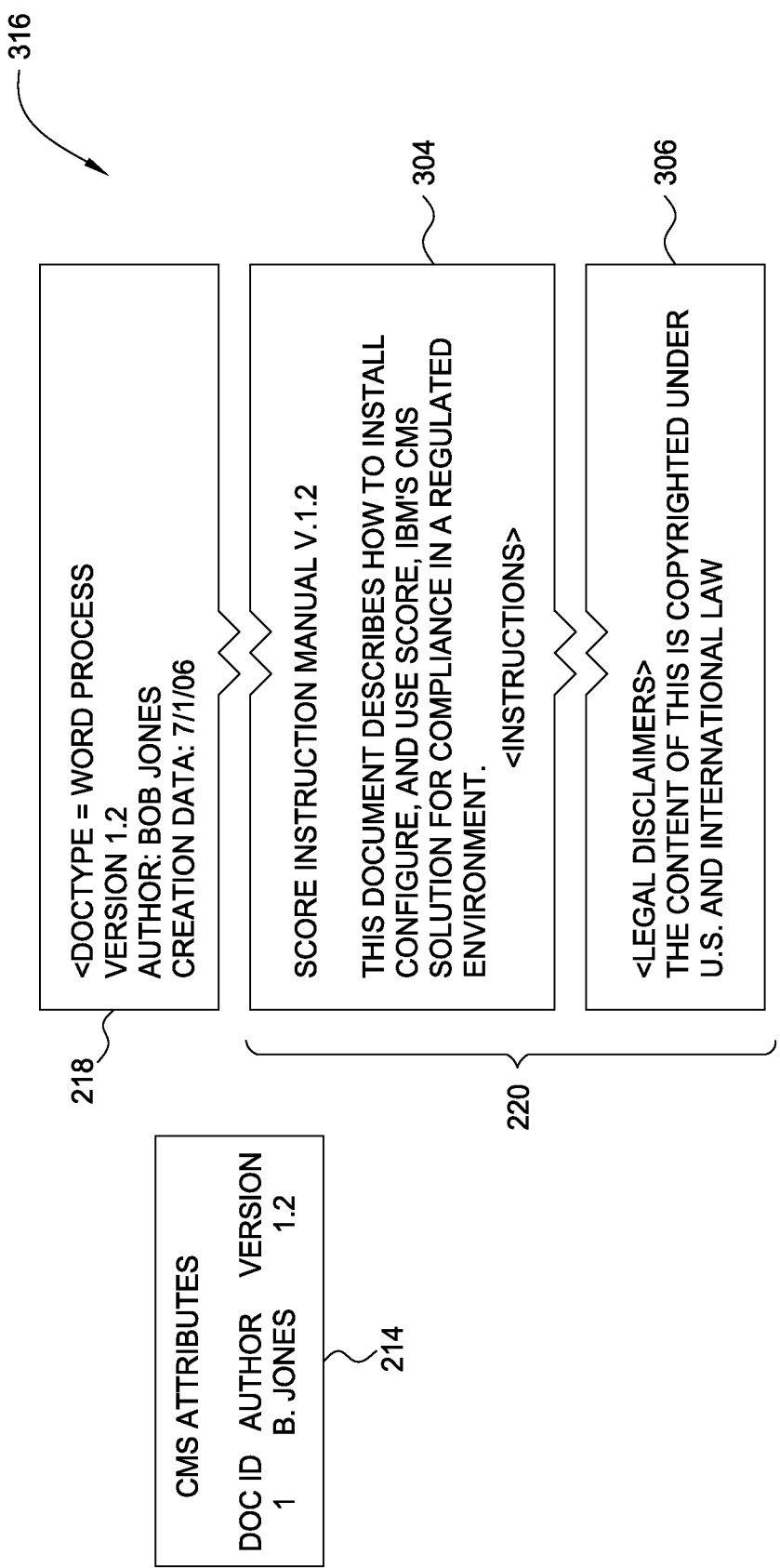
FIG. 3 illustrates an exemplary data object that may be checked-in and checked-out from a content management system, according to one embodiment of the invention.

FIG. 3 further illustrates an exemplary CMS data object 316, according to one embodiment of the invention. In this case, FIG. 3 shows an XML document 316 rendered to display a portion of a product manual. As shown, document 316 includes metadata 218 specifying a "doctype", a version, an author and a creation date. CMS data attributes 214 include values for the author and version of document 316, as well as a document ID used by CMS 130. In one embodiment, when document 316 is synchronized with CMS 130, data attributes 214 may be updated based on the content of document 316.

Illustratively, document content 220 is shown to include an introduction section 304 and a "legal disclaimer" section 306. When document 216 is synchronized with CMS data attributes 214, values from the document metadata 218 may be used to update the values of attributes 214. Conversely, for a one-way synchronization from CMS attributes 214 to document 316, the values from attributes 214 may be used to update either the metadata 218 or the content 220 of document 316 (or both). For example, CMS attributes 214 may include a reference to standardized language that should be used as the legal disclaimer 306 in multiple product manuals. Using XML, CMS attributes 214 may specify an Xinclude statement used to merge a standard legal disclaimer into document 316 whenever it is synchronized with CMS 130.

Figure 4:
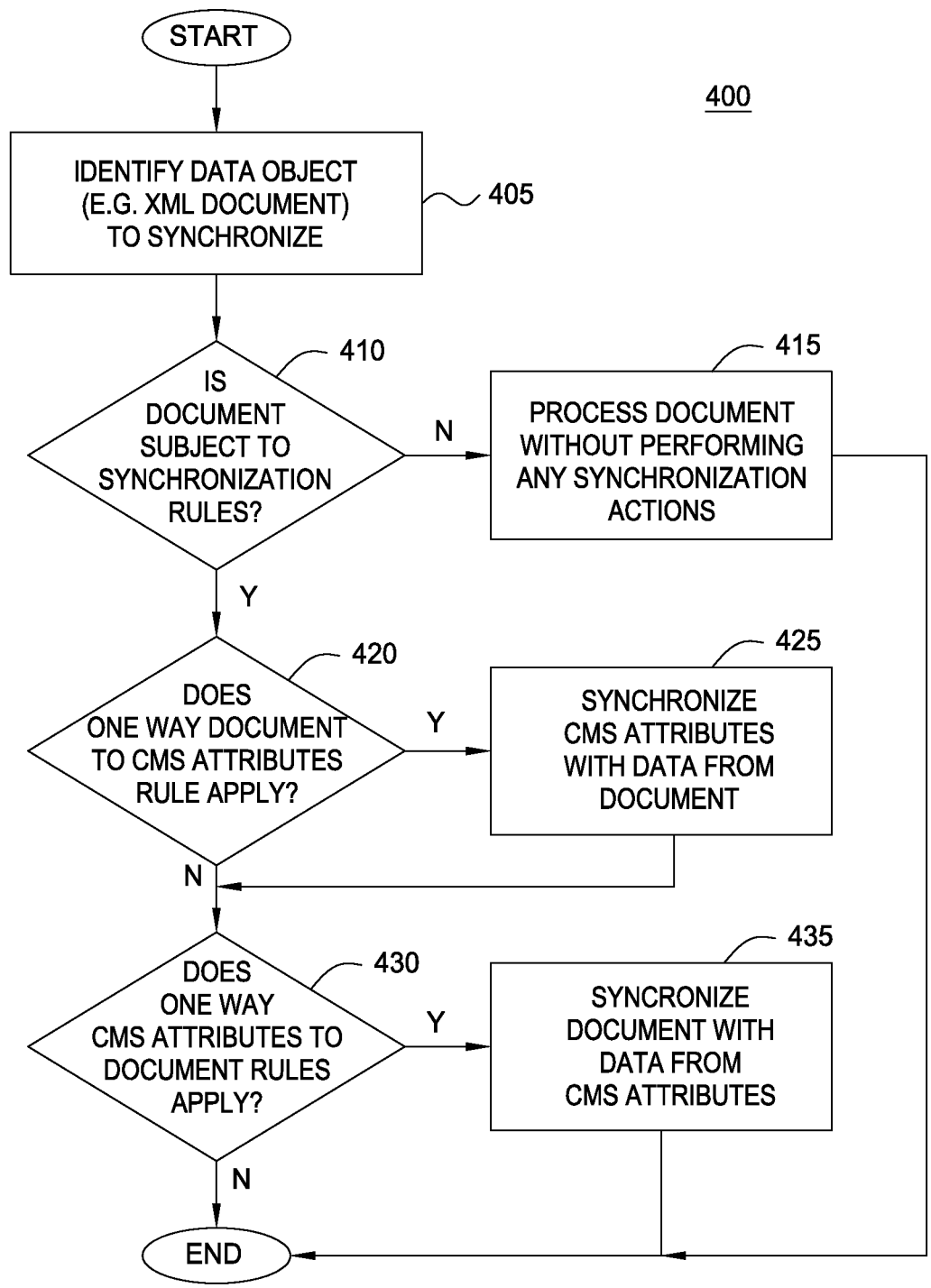
FIG. 4 illustrates a method for synchronizing information included in a data object with CMS attributes related to that object, and vice-versa, according to one embodiment of the invention.

FIG. 4 illustrates a method for synchronizing information included in a data object (e.g., XML document 316) with data attributes 214 managed by CMS 130 related to that object, and vice-versa, according to one embodiment of the invention. As shown, the method 400 begins at step 405 where a data object to synchronize is identified. As described above, in one embodiment, data objects may be represented as an XML document and checked-in or checked-out from CMS 130. When checked-in or checked out, such a document may be synchronized with CMS attributes 214 based synchronization rules 208. Alternatively, CMS user interface 202 may allow a user to specify a particular data object 212 to synchronize with CMS attributes 214.

At step 410, the CMS 130 determines which synchronization rules 208 to apply to the data object identified at step 405. For example, synchronization rules 208 may be customized for a particular client application 108 or document type. If no synchronization rules are applicable, then the method proceeds to step 415 where the document identified at step 405 is processed (e.g., checked-in, checked-out) without any synchronization actions being performed. Otherwise, at step 420, the CMS 130 may determine whether any one-way document to CMS attribute rules are applicable to the document being synchronized.

At step 425, any such synchronization rules may be used to perform a one-way document to CMS attribute synchronization. FIG. 5A illustrates the application of a one-way document to CMS attribute synchronization rule, according to one embodiment of the invention. Specifically, FIG. 5A illustrates a one-way synchronization between the content of an XML document 505 and CMS attributes 510 maintained by CMS 130. As shown, synchronization rule 508 specifies that CMS attributes 510 should be synchronized using information from an XML document 505. Specifically, the document metadata 507 of document 505 includes both a version number "2" and a revision number "1". The synchronization rule 508 specifies that CMS attribute 511 "version" should be updated as a combination of the "version" and "revision" metadata 507 of document 505. After being synchronized, the CMS attribute 511 is updated to a value of "2.1." Synchronization rule 508 may specify any form of data processing in order to generate a value for the CMS attribute 511 based on any combination of content, elements or any other CMS attribute values 507 present in a document 505. Thus, a synchronization rule 508 may specify stored procedures, remote procedure calls, or other forms of data processing to perform when synchronizing CMS attributes with a given document.

After performing any one-way document to CMS attribute synchronization rules at steps 420 and 425, the method 400 proceeds to step 430 where CMS 130 may determine whether any one-way CMS attribute to document rules are applicable to the document being synchronized.

At step 435, any such synchronization rules may be used to perform a one-way CMS attribute to document synchronization. FIG. 5B illustrates the application of a one-way CMS attribute to document synchronization rule, according to one embodiment of the invention. Specifically, FIG. 5B illustrates a one-way synchronization between attributes 520 maintained by CMS 130 and the content of an XML document 515. The synchronization rule 518 specifies that a CMS attribute 511 "required notice" should updated using an Xinclude statement 521 anytime the document 515 is synchronized. After being synchronized, the "legal disclaimer" element 519 of document 515 reflects the content included in the "legal.xml" file referenced by CMS attribute 521. Synchronization rule 518 may specify any form of data processing in order to generate a value for the XML document 515 being synchronized, based on any combination of content, elements and/or attributes included in (or referenced by) CMS attributes 521. Thus, a synchronization rule 518 may specify stored procedures, remote procedure calls, or other forms of data processing to perform when a given document is synchronized with CMS attributes. After performing any one synchronization rules at steps 420-435, the method 400 concludes at step 440.

Advantageously, embodiments of the invention provide techniques for synchronizing content/metadata of a data object managed by a CMS (e.g., an XML document) and attributes about the document managed by the CMS. Synchronization rules used to synchronize the document and CMS attributes may include both CMS attribute to content rules and content to CMS attribute rules.

Embodiments of the invention allow content of a data object to be updated based on several variables, including multiple CMS attributes. In addition, embodiments of the invention allow one-way synchronization to be enforced (in either "direction"). Generally, the use of one-way synchronization rules greatly improves the configuration flexibility of content management systems.

While the foregoing is directed to embodiments of the present invention, other and further embodiments of the invention may be devised without departing from the basic scope thereof, and the scope thereof is determined by the claims that follow.

What is claimed is:

1. A non-transitory computer-readable medium to perform a one-way synchronization between a data object managed by a content management system (CMS) and CMS attributes related to the data object maintained by the CMS, the non-transitory computer-readable medium containing a program executable to:
    select the data object to be synchronized;
    identify one or more one-way synchronization rules to apply to the selected data object and the CMS attributes, wherein the one-way synchronization rule synchronizes information stored in the data object with information stored in the CMS attributes or vice versa; and
    synchronize the selected data object and the CMS attributes by operation of one or more computer processors when executing the program, and by applying the one or more one-way synchronization rules to the selected data object and the CMS attributes.

2. The non-transitory computer-readable medium of claim 1, wherein the one-way synchronization rule synchronizes information stored in the data object with information stored in the CMS attributes.

3. The non-transitory computer-readable medium of claim 2, wherein the data object is an Extensible Markup Language (XML) document, wherein the one-way synchronization rule specifies an element, an attribute, or element content to update in the XML document, based on the values of one or more CMS attributes.

4. The non-transitory computer-readable medium of claim 1, wherein the one-way synchronization rule synchronizes the information stored in the CMS attributes with the information stored in the data object, wherein the data object is an Extensible Markup Language (XML) document, wherein the one-way synchronization rule specifies one or more CMS attributes to update based on the values of multiple elements or attributes in the XML document.

5. The non-transitory computer-readable medium of claim 1, wherein the one or more one-way synchronization rules are composed according to a rules schema defined for the CMS.

6. The non-transitory computer-readable medium of claim 5, wherein the rules schema is an Extensible Markup Language (XML) schema and document type definition (DTD).

7. A system to perform a one-way synchronization between a data object managed by a content management system (CMS) and CMS attributes related to a data object maintained by the CMS, the system comprising:
one or more computer processors; and
a memory containing a program which, when executed by the one or more computer processors, performs an operation comprising:
selecting the data object to be synchronized;
identifying one or more one-way synchronization rules to apply to the selected data object and the CMS attributes, wherein the one-way synchronization rule synchronizes information stored in the data object with information stored in the CMS attributes or vice versa; and
synchronizing the selected data object and the CMS attributes by applying the one or more one-way synchronization rules to the selected data object and the CMS attributes.

8. The system of claim 7, wherein the one-way synchronization rule synchronizes information stored in the data object with information stored in the CMS attributes.

9. The system of claim 8, wherein the data object is an Extensible Markup Language (XML) document, wherein the one-way synchronization rule specifies an element, an attribute, or element content to update in the XML document, based on the values of one or more CMS attributes.

10. The system of claim 7, wherein the one-way synchronization rule synchronizes the information stored in the CMS attributes with the information stored in the data object, wherein the data object is an Extensible Markup Language (XML) document, wherein the one-way synchronization rule specifies one or more CMS attributes to update based on the values of multiple elements or attributes in the XML document.

11. The system of claim 7, wherein the one or more one-way synchronization rules are composed according to a rules schema defined for the CMS.

12. The system of claim 11, wherein the rules schema is an Extensible Markup Language (XML) schema and document type definition (DTD).

13. The system of claim 7, wherein the one or more one-way synchronization rules are composed according to a rules schema defined for the CMS, wherein the data object comprises a document, wherein in a first instance, the one-way synchronization rule synchronizes information stored in the data object with information stored in the CMS attributes.

14. The system of claim 13, wherein the document comprises an XML document, wherein the one-way synchronization rule specifies an element, an attribute, or element content to update in the XML document, based on the values of one or more CMS attributes, wherein the rules schema is an Extensible Markup Language (XML) schema and document type definition (DTD).

15. The system of claim 14, wherein the one-way synchronization rule specifies a target to update in the XML document, based on the values of one or more CMS attributes, wherein the target is, in respective instances, the element, the attribute, and the element content.

16. The system of claim 15, wherein in a second instance, the one-way synchronization rule synchronizes information stored in the CMS attributes with information stored in the data object;
wherein in a third instance, the one-way synchronization rule specifies one or more CMS attributes to update based on the values of multiple elements in the XML document;
wherein in a fourth instance, the one-way synchronization rule specifies one or more CMS attributes to update based on the values of multiple attributes in the XML document.

17. The system of claim 16, wherein the selected data object and the CMS attributes are synchronized only upon successfully identifying one or more one-way synchronization rules to apply to the selected data object and the CMS attributes, wherein the operation further comprises:
upon unsuccessfully identifying any one-way synchronization rule to apply to the selected data object and the CMS attributes, processing the data object without synchronizing the data object and the CMS attributes.

18. The system of claim 17, wherein synchronizing the selected data object and the CMS attributes comprises:
only upon determining that the one-way synchronization rule is a one-way document-to-CMS-attribute synchronization rule, synchronizing the CMS attributes using the information stored in the document; and
only upon determining that the one-way synchronization rule is a one-way CMS-attribute-to-document synchronization rule, synchronizing the document using the information stored in the CMS attributes.

19. The non-transitory computer-readable medium of claim 1, wherein the data object is an Extensible Markup Language (XML) document.

20. The system of claim 7, wherein the data object is an Extensible Markup Language (XML) document.

* * * * *